(12) United States Patent  (10) Patent No.: US 7,697,057 B2
Yoshida  (45) Date of Patent: Apr. 13, 2010

(54) IMAGE-PICKUP APPARATUS INDICATING A FOCUSED AREA AND CAMERA

(75) Inventor: Akihiro Yoshida, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 847 days.

(21) Appl. No.: 11/229,683

(22) Filed: Sep. 20, 2005

(65) Prior Publication Data

US 2006/0061677 A1  Mar. 23, 2006

(30) Foreign Application Priority Data

Sep. 22, 2004  (JP) .............................. 2004-275836

(51) Int. Cl.
 *G03B 13/00* (2006.01)
 *H04N 5/232* (2006.01)
(52) U.S. Cl. .................. 348/346; 348/333.02; 348/349
(58) Field of Classification Search ................. 348/345, 348/349
 See application file for complete search history.

(56) References Cited

U.S. PATENT DOCUMENTS

| | | | | |
|---|---|---|---|---|
| 6,812,967 | B1* | 11/2004 | Niikawa et al. | 348/333.05 |
| 7,046,290 | B2* | 5/2006 | Nozaki | 348/350 |
| 7,230,648 | B2* | 6/2007 | Ueno | 348/340 |
| 7,304,681 | B2* | 12/2007 | Larner et al. | 348/352 |
| 7,349,020 | B2* | 3/2008 | Stavely et al. | 348/333.02 |
| 7,456,896 | B2* | 11/2008 | Nakashima et al. | 348/345 |
| 2003/0076437 | A1* | 4/2003 | Karasaki et al. | 348/347 |
| 2003/0164890 | A1* | 9/2003 | Ejima et al. | 348/333.1 |
| 2003/0193600 | A1* | 10/2003 | Kitamura et al. | 348/333.01 |
| 2007/0153112 | A1* | 7/2007 | Ueda et al. | 348/335 |

FOREIGN PATENT DOCUMENTS

| | | | |
|---|---|---|---|
| JP | 2002-6206 | | 1/2002 |
| JP | 2003-206449 | * | 2/2003 |
| JP | 2003037771 A | * | 2/2003 |
| JP | 2004-23747 | | 1/2004 |
| JP | 2004-023747 | * | 1/2004 |

\* cited by examiner

*Primary Examiner*—Ngoc-Yen T Vu
(74) *Attorney, Agent, or Firm*—Oblon, Spivak, McClelland, Maier & Neustadt, L.L.P.

(57) ABSTRACT

An image-pickup apparatus including: a photographing optical system (100); an image-pickup device (102) having a first driving mode for outputting charges in a predetermined number of pixels and a second driving mode for outputting charges in a number of pixels fewer than the predetermined number of pixels in the first driving mode; an image display device (110); and an auto focus arithmetic control unit (104, 111) for carrying out auto focus arithmetic control according to an output signal from the image-pickup device (102), wherein during an auto focus operation, the auto focus arithmetic control unit (104, 111) drives the image-pickup device (102) in the second driving mode, and updates and outputs an image data of an area used for auto focus calculation to the image display device (110), and wherein right after the auto focus operation, the auto focus arithmetic control unit (104, 111) makes the image display device (110) to display an image thereon to indicate a focused area in the displayed image.

4 Claims, 5 Drawing Sheets

IMAGE DISPLAY (β) DURING AN AF OPERATION

IMAGE DISPLAY (γ) RIGHT AFTER AN AF OPERATION

AREA SEGMENTS ON THE IMAGE-PICKUP DEVICE

THE NUMBER OF PIXELS THE CHARGES IN WHICH ARE OUTPUTTED FROM THE IMAGE-PICKUP DEVICE DURING A PREVIEW

THE NUMBER OF PIXELS THE CHARGES IN WHICH ARE OUTPUTTED FROM THE IMAGE-PICKUP DEVICE DURING AN AF OPERATION

IMAGE DISPLAY ($\alpha$) DURING A PREVIEW

IMAGE DISPLAY ($\beta$) DURING AN AF OPERATION

IMAGE DISPLAY ($\gamma$) RIGHT AFTER AN AF OPERATION

IMAGE-PICKUP APPARATUS INDICATING A FOCUSED AREA AND CAMERA

BACKGROUND

The present application is based on, and claims priority from, Japanese Patent Application No. 2004-275836, filed on Sep. 22, 2004, the contents of which are hereby incorporated by reference herein in its entirety.

1. Field of the Invention

The present invention relates to an image-pickup apparatus and a camera having the same, including an image-pickup device, a display device for displaying an image picked up by the image-pickup device and an auto focus arithmetic control unit.

2. Description of Related Art

Conventionally, as to a camera, such as a digital camera, including an image pickup device and a display means for displaying an image picked up by the image pick device, there is known a camera having a reading mode for reading an image relatively fast by way of reading a certain portion of the image in order to provide faster auto focus control and an appropriate preview display while an auto focus control is performed, and updating and displaying the read certain portion of the image as a preview display (e.g., Japanese patent publication laid-open No. 2004-023747).

A CCD is employed as an image-pickup device in most digital cameras. Such a camera is configured to carry out auto focusing according to image information obtained by a CCD. There exists a "mountain-climbing-scan method" in a conventional art for auto focusing by way of a CCD driving method. An exclusive driving mode is known for performing fast auto focusing with the mountain-climbing-scan method. According to this driving method, during focusing computation (arithmetic calculation) process for a display screen, only an area including required image data is read and an unnecessary area is flashed and transferred fast (fast flashing transfer). Normally, a screen is vertically divided into three areas: an upper area; a middle area; and a lower area. The middle area is configured to be an area to be read, and the upper and lower areas are configured to be areas to be fast flashed. Such a driving method has an advantage where contrast information (high-frequency component information) of an object to be photographed can be obtained fast relative to a normal preview driving method, on the contrary, it has also two disadvantages as follows.

First, image data of all field of an angle of view cannot be obtained during a focusing operation with an image-pickup apparatus configured to carry out the above-described driving method. Thus, an image on a display portion such as a liquid crystal panel employed in the image-pickup apparatus cannot be updated and therefore the apparatus keep displaying the image displayed just before shifting to an auto focus operation. For instance, a camera is configured to be an apparatus required to be capable of following an object to be photographed by an operator at all time. However, in the case where renewal of the displayed image is not carried out for some seconds, it is hard for the operator to follow a moving object, and deterioration of usability of the apparatus may occur.

An increase in electrical power consumption can be a second disadvantage. This disadvantage results from that a transfer clock frequency is increased when the area unnecessary for the above calculation is fast flushed (flushed at high speed). Basically, electrical power consumption is increased especially in a focusing operation in a sequence of operations of an image-pickup apparatus because a motor is driven. Moreover, the increase in electrical power consumption at the image-pickup portion gives rise to shortening of a life of a battery employed in the apparatus.

SUMMARY

The present invention has been made in consideration of such conventional problems. One feature of the present invention is that an image-pickup apparatus comprises: a photographing optical system; an image-pickup device having a first driving mode for outputting charges in a predetermined number of pixels and a second driving mode for outputting charges in a number of pixels fewer than the predetermined number of pixels in the first driving mode; an image display device; and an auto focus arithmetic control unit for carrying out auto focus calculation and control according to an output signal from the image-pickup device, wherein during an auto focus operation, the auto focus arithmetic control unit drives the image-pickup device in the second driving mode, and updates and outputs an image data of an area used for auto focus calculation to the image display device, and wherein right after the auto focus operation, the auto focus arithmetic control unit makes the image display device to display an image thereon to indicate a focused area in the displayed image.

The apparatus according to the invention has a capability of limiting to and displaying an area used for focusing calculation on an image display device when the apparatus is exclusively driven for auto focusing (hereinafter "cutout driving" will be used for such a driving state) so that a display image can be updated during cutout-driving. During cutout-driving a displayed area is limited to an area used for focusing calculation because such an area can be updated even during cutout-driving, and there is a further advantage that an operator can recognize a focus area as he handles the apparatus. In addition, the apparatus can assist the operator in photographing by providing focused area-information after a focusing operation.

Further, the apparatus according to the present invention has a capability of informing an operator of a state of a focusing operation and a result of the focusing operation.

These and other objects, features and advantages of the invention will be appreciated upon reading of the description of the invention when in conjunction with the attached drawings, with the understanding that some modifications, variations and changes of the invention could be easily made by the skilled person in the art to which the invention pertains without departing from the spirit of the invention or the scope of the claims.

BRIEF DESCRIPTION OF THE DRAWINGS

For a better understanding of the invention, reference is made to the attached drawings, wherein.

DETAILED DESCRIPTION OF THE PREFERRED EMBODIMENTS

Figure 1:
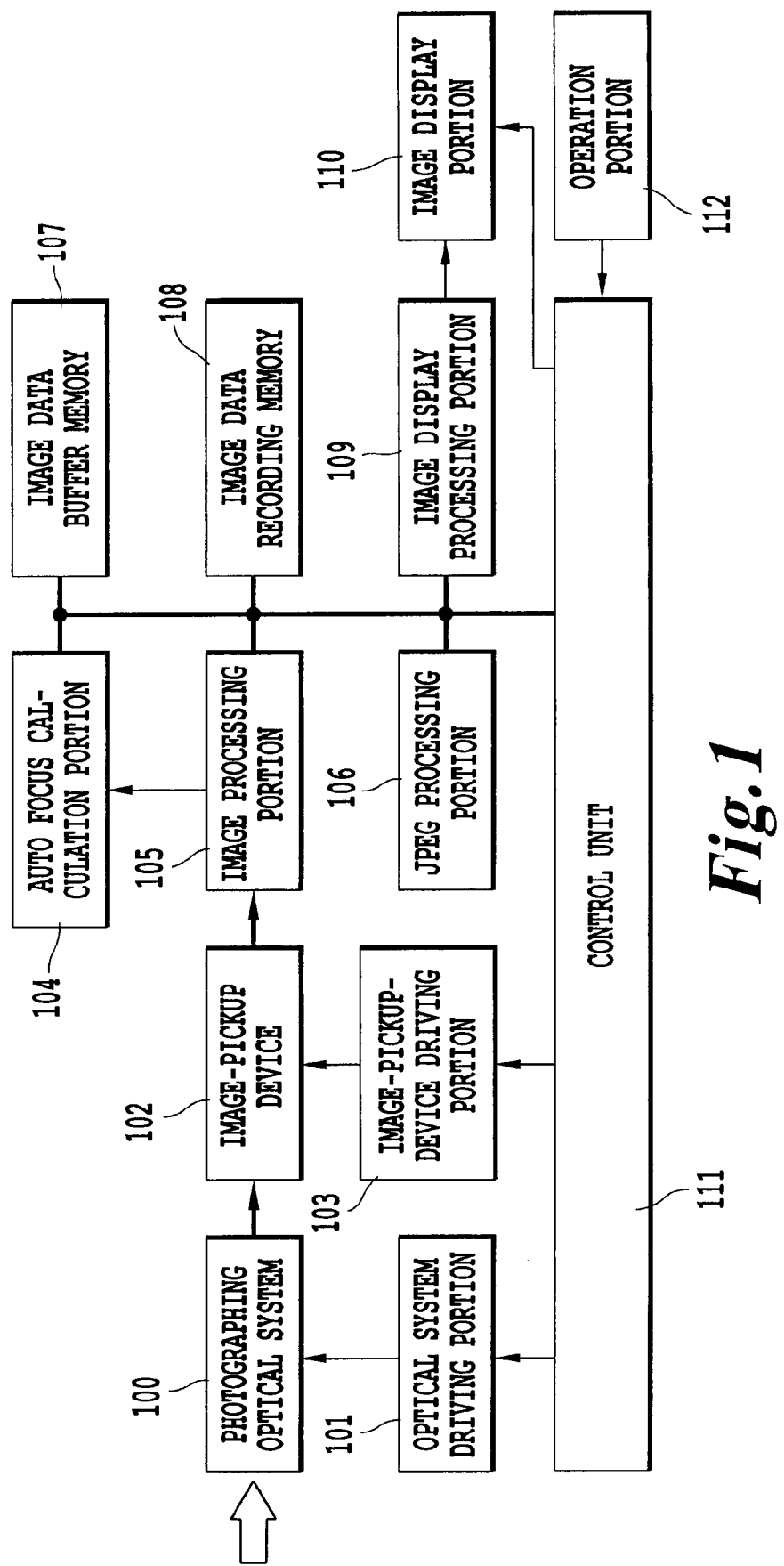
FIG. 1 is a block diagram showing an example of an electrical process system in an image-pickup apparatus or a camera according to the present invention.

One embodiment of an image-pickup apparatus/camera will be described below, referring to the drawings.

FIG. 1 shows an example of a structure of an image-pickup apparatus for recording a still image as an image-pickup apparatus according to the present invention. In FIG. 1, whole control of the apparatus is configured to be carried out only by a control unit 111. A photographing optical system 100 is provided with focus lenses and is configured to perform scanning according to control of the control unit 111, being driven by a focus motor and a focus motor driving circuit employed in an optical system driving portion 101 during focusing operation. An image of an object to be photographed is formed onto an image-pickup plane of an image-pickup device 102. The image-pickup device 102 is driven according to a driving signal outputted from an image-pickup-device driving portion 103, and outputs an image signal corresponding to the object. The image-pickup-device driving portion 103 is capable of performing at least following driving methods; a method for preview-driving for displaying an image of an object to be photographed on a display device before photographing, a cutout-driving method for focusing; and a method of driving for a still image. A display mode of an image display portion 110 as the display device is configured to be switched to another mode according to a change of the driving method.

Output of the image-pickup device 102 is inputted to an image processing portion 105, and a CDS process, an AD conversion, a data-size conversion, $\gamma$-process, a YUV conversion, etc. are carried out at the image processing portion 105. An image signal for focus calculation diverged from the image processing portion 105 is outputted to an auto focus (hereinafter "AF") calculation portion 104 for performing auto focus (arithmetic) calculation. The AF calculation (AF computation) portion 104 is provided with a highpass/bandpass filter and an integral circuit, and calculates (computes) an integral value of a high-frequency component of an image. The high-frequency components becomes more the greater output is, thus, a focus is properly adjusted if a focus position is on a position where an amount of high-frequency components indicates maximum. An image signal outputted from the image processing portion 105 is also inputted to an image display processing portion 109. Conversion between enlargement display and non-enlargement display, etc. is carried out at the image display processing portion 109, and an image in conformity with the image signal is configured to be enlarged/non-enlarged according to the conversion and be displayed on the image display portion 110. The image display portion 110 is configured to change a level of display luminance thereof according to a command from the control unit 111.

The image signal outputted from the image processing portion 105 is inputted to and is temporarily recorded on an image data buffer memory 107 for temporarily recording an image signal, and is inputted to and is recorded on an image data recording memory 108. The image signal is also inputted to a JPEG processing portion 106 and is compressed based on a predetermined standard. Various operation signals from an operation portion 112 are inputted to the control unit 111, and the control unit 111 controls operations of the above-described functional portions according to the inputted operation signals. Based on the output signal from the image-pickup device 102, a focus position is determined by the AF calculation portion 104 and the control unit 111, both of which constitute an auto focus arithmetic control unit for driving and controlling a focusing device of the photographing optical system 100.

Figure 2:
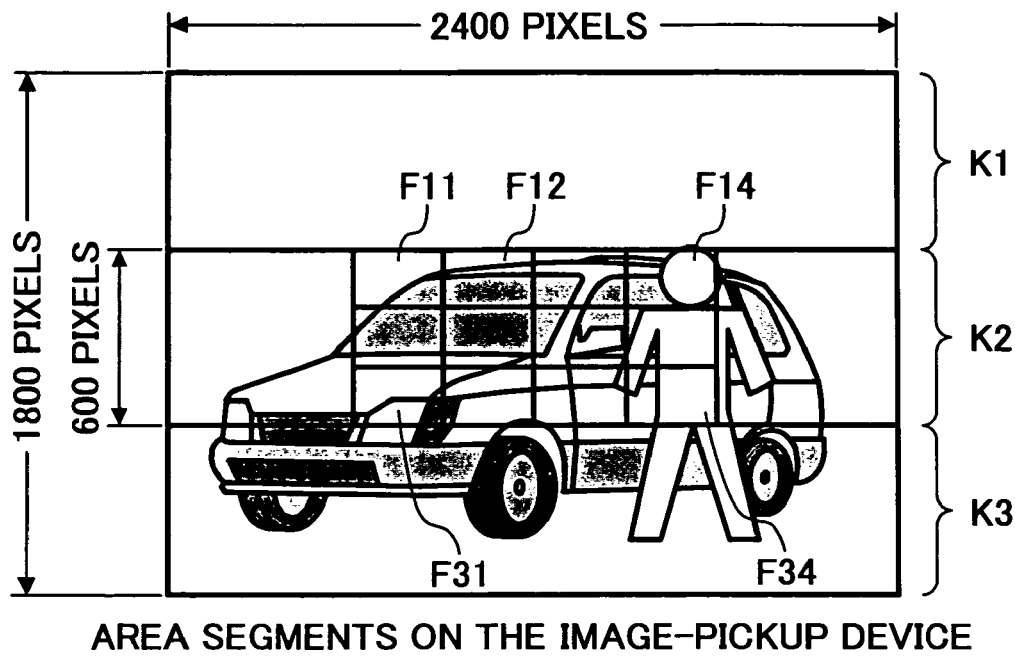
FIG. 2 is a front view showing an example of image-pickup area segments on the image-pickup device and an example of a number of pixels the charges in which are outputted from the image-pickup device
Figure 3:
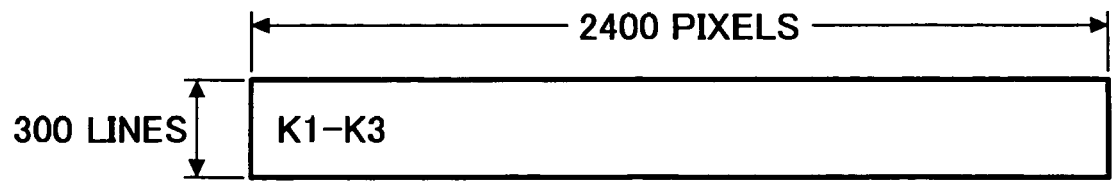
FIG. 3 is a schematic diagram showing an example of a number of pixels the charges in which are outputted from the image-pickup device during a preview.
Figure 4:
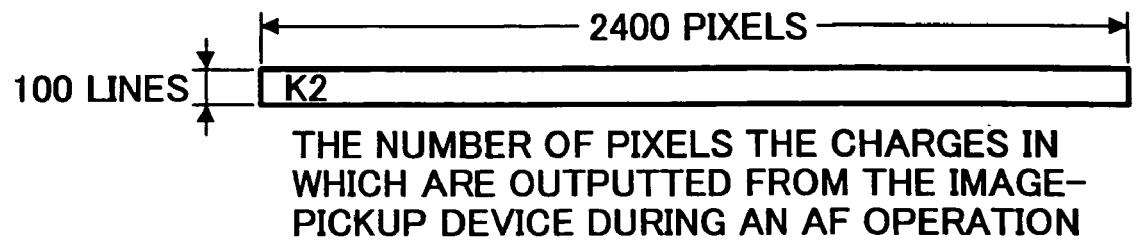
FIG. 4 is a schematic diagram showing an example of a number of pixels the charges in which are outputted from the image-pickup device during an AF operation.

The image-pickup plane of the image-pickup device 102 is divided into a plurality of areas. FIG. 2 shows an example of image-pickup area segments on the image-pickup device, FIG. 3 shows an example of a number of pixels the charges in which are to be outputted from the image-pickup device during a preview, and FIG. 4 is a schematic diagram showing an example of the number of pixels the charges in which are to be outputted from the image-pickup device during an AF operation. For example, as shown in FIG. 2, a CCD provided with an image-pickup plane having 4.32 mega pixels composed of 1,800 vertical pixels ×2,400 horizontal pixels may be employed as the image-pickup device. The image-pickup plane is vertically and equally divided with horizontal lines into three portions, which are configured to be image-pickup areas K1, K2, K3 numbered beginning at the top portion thereof During a preview, the control unit 111 is configured to control all the image-pickup areas K1, K2 and K3 to be vertically compressed into one sixth by pixel skipping and adding in order that the compressed data may be outputted. Thus, as shown in FIG. 3, a size of data to be outputted, i.e. the number of pixels the charges in which are to be outputted from the image-pickup device is changed into 300 lines ×2,400 pixels. On the other hand, during an AF operation, only the image-pickup areas K2 is compressed into one sixth by pixel skipping and adding, and is outputted. Thus, as shown in FIG. 4, a size of data to be outputted, i.e. the number of pixels the charges in which are to be outputted from the image-pickup device is changed into 100 lines ×2,400 pixels. As described above, the number of pixels the charges in which are outputted during an AF operation becomes fewer than those during a preview. Therefore, faster auto focusing may be achieved because of the difference of the number of pixels the charges in which are outputted. Further, a portion of the image-pickup areas K2 is equally divided into four blocks in a horizontal direction and three blocks in a vertical direction, that is, the image-pickup areas K2 includes a focus calculation area having 12 blocks composed of F11 to F14, F21 to F24 and F31 to F34. At the AF calculation portion 104 shown in FIG. 1, extraction of a high-frequency component and integration of the extracted component are carried out to detect a focus position.

Figure 5:
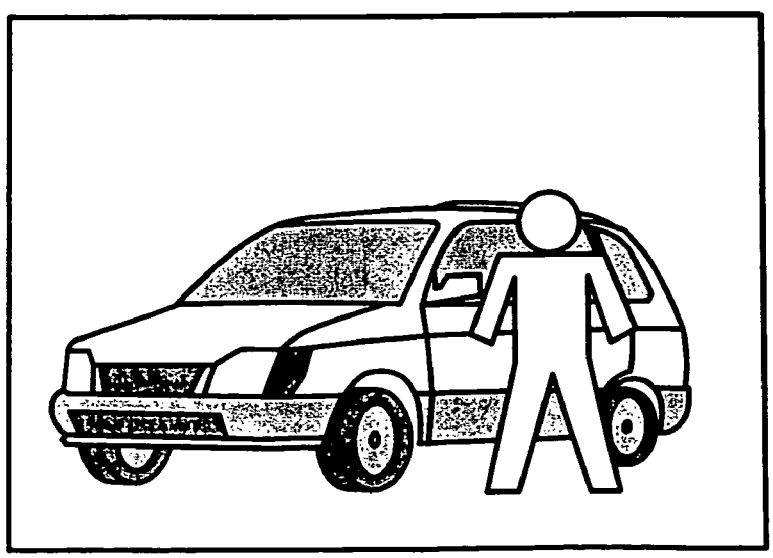
FIG. 5 is a front view showing an example of an image display during a preview.
Figure 6:
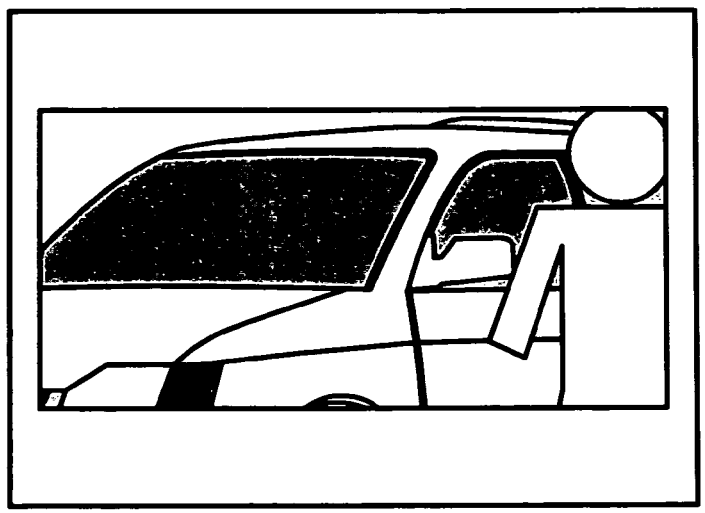
FIG. 6 is a front view showing an example of an image display during an AF operation.
Figure 7:
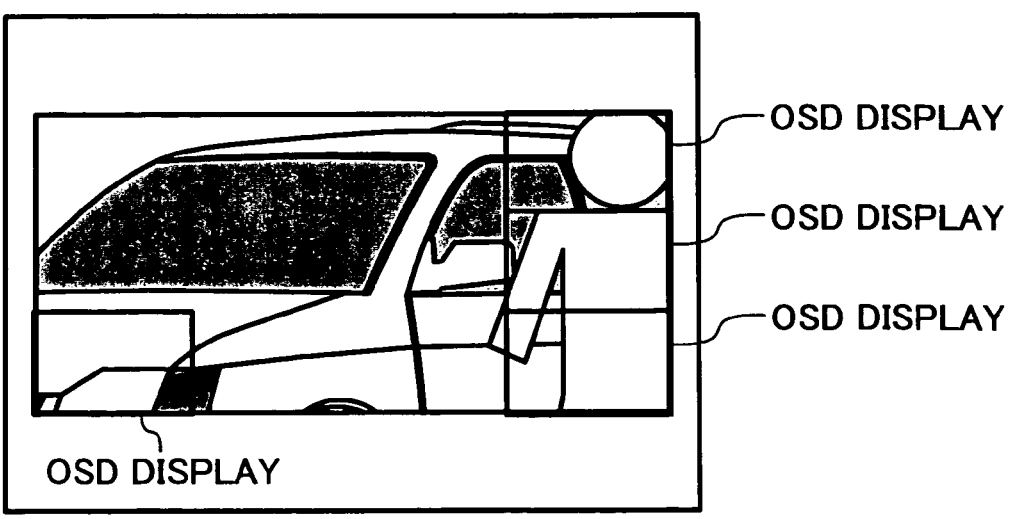
FIG. 7 is a front view showing an example of an image display just after an AF operation.

FIG. 5 shows an example of an image display during a preview, FIG. 6 shows an example of an image display during an AF operation, and FIG. 7 shows an example of an image display just after an AF operation. The image display during a preview shown in FIG. 5 is an example where an image according to the image data obtained with the number of pixels the charges in which are outputted is displayed to a whole angle of field. The image display immediately after an AF operation shown in FIG. 6 is an example where an image according to the image data obtained from the cutout area (clipped area) with the pixels in conformity with the number of pixels (shown in FIG. 4) the charges in which are outputted is enlarged and displayed. FIG. 7 shows an image display just after an AF operation, and a focus block reflecting a focused area is framed and displayed with an OSD (On Screen Display). In the example in FIG. 7, OSDs indicate that focus blocks F14, F24 and F34 (a person to be photographed), three lines on the most right side, and a focus block F31 (a front portion of a vehicle to be photographed) at the bottom on the most light side are focused.

Figure 8:
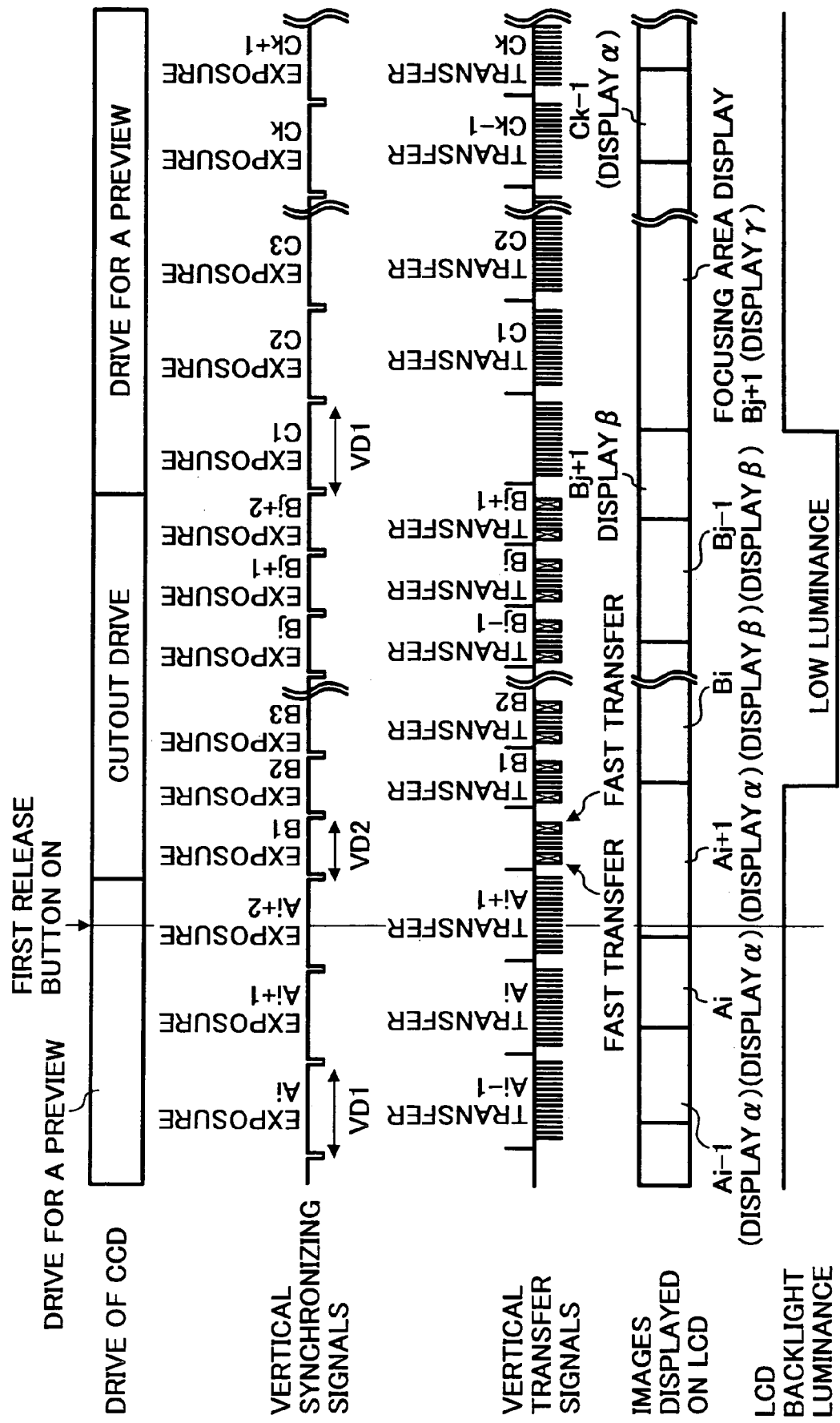
FIG. 8 is an image-pickup sequence diagram showing an operation of an embodiment described below.

Operations of the above embodiment will be described below with reference to FIG. 8 showing an image-pickup sequence. In this example, illustrated is the sequence commencing with and returning to a preview operation via a focus operation initiated by a first release button being depressed. In a preview, for simplification of the drawing, a period of vertical synchronizing signals (VD1) is configured to be equal with an update rate of the crystal display, however, the equality is not necessary. A vertical broken line in FIG. 8 designates an occurrence of depression of the first release button. A signal produced when the first release button is depressed is one of signals imputed to the control unit 111 from the operation portion 112 as shown in FIG. 1. The control unit 111 detects the signal, and commands the image-pickup-device driving portion 103 that a driving operation be changed into a cutout-driving operation in synchronous with a next vertical signal. Display images displayed on the liquid crystal display panel during a driving operation of a preview are designated by $A_{i-1}$, $A_i$ in a sequential order in FIG. 8. During this period, an image display is configured to be displayed as a whole-field angle display a as shown in FIG. 5. This display mode for the preview-driving operation by the display device is designated as a first driving mode.

The control unit 111 controls operations of the optical system driving portion 101 simultaneously with a conversion to the cutout-driving operation, and the optical system driving portion 101 carries out a focusing operation by driving the focus lens(es) of the photographing optical system 100. Even at this point, the display image $A_{i-1}$ is configured to be a whole-field angle display α. A period of vertical synchronizing signals during a focusing operation is designated by VD2, and the period VD2 is configured to be shorter than the period VD1 of vertical synchronizing signal for a preview operation. Thus, an auto focus operation can be speeded up. In FIG. 8, "FAST TRANSFER" marked in the sequence of Vertical transfer signals designates a driving operation for fast flushing out and transferring image data obtained from areas K1 and K2 which are not required for focus calculation. This transfer gives rise to an increase in electrical power consumption of the image-pickup apparatus. As a countermeasure against the increase, luminance of the backlight of the liquid crystal display is reduced from DISPLAY B1 as shown in FIG. 8. DISPLAY B1 is displayed alternative to the display image a on the liquid crystal display panel during a preview driving operation, and is configured to be an image β which is a displayed and enlarged image based on an image data obtained in the cutout image-pickup area as shown in FIG. 6. This display mode for the cutout-driving operation (auto focus operation) of the display device is designated as a second driving mode. During the cutout-driving operation, as shown by $B_{j-1}$ and $B_{j+1}$ in FIG. 8, a display screen image is sequentially updated. After completion of focus calculation (computation), focus blocks reflecting focused areas are framed with OSDs and displayed based on an exposed image data on the liquid crystal display image $B_{j+1}$ (DISPLAY$_\gamma$) as shown in FIG. 7. This DISPLAY$_\gamma$ is prepared for an operator to check a focused area, thus, preferably it may be displayed for 0.2 to 1 second. After the DISPLAY$_\gamma$ is displayed, the mode goes back to the driving mode for a preview, i.e., the first driving mode, and the DISPLAY α is displayed on the display device including the liquid crystal display panel.

According to the present invention, the image-pickup apparatus or the camera including the same comprising: a photographing optical system; an image-pickup device having a first driving mode for outputting charges in a predetermined number of pixels and a second driving mode for outputting charges in a number of pixels fewer than the predetermined number of pixels in the first driving mode; an image display device; and an auto focus arithmetic control unit for carrying out auto focus arithmetic calculation (AF computation) and AF control according to an output signal from the image-pickup device, wherein during an auto focus operation, the auto focus arithmetic control unit drives the image-pickup device in the second driving mode, and updates and outputs an image data of an area used for auto focus calculation (computation) to the image display device, and wherein right after the auto focus operation, the auto focus arithmetic control unit makes the image display device to display an image thereon to indicate a focused area in the displayed image. Thus, a faster focus operation can be performed without suspending renewal of a preview image.

Further to the above-mentioned effect, according to the image-pickup apparatus or the camera having the same, the auto focus arithmetic control unit makes the image display device to enlarge and display an image during an auto focus operation, therefore, an operator can visually check a result of a focusing operation easily.

The present invention can provides the apparatus/camera capable of displaying an enlarged image in order to improve the visibility of an operator. Thus, a certain level of a focus/defocus state can be recognized with the displayed enlarged image if a large-sized LCD having high resolution is employed in the apparatus.

In addition, according to the image-pickup apparatus/camera of the present invention, the image display device is configured to be a liquid crystal display panel having a backlight thereof, and the auto focus arithmetic control unit reduces luminance of the backlight during an auto focus operation. Thus, an increase in electrical power consumption, which may cause a negative effect upon a regular operation of the apparatus, can be held down.

Therefore, the apparatus/camera can reduce the effect of increase in electrical power consumption caused by fast flashing transfer (high speed flashing transfer) during cutout-driving by way of reducing electrical power consumption of a backlight circuit of a liquid crystal panel.

As described above, according to the present invention, the aforementioned objects can be achieved. The present invention is applicable to any kind of an apparatus/camera including an auto focus function, capable of displaying a preview of an object to be photographed with an image display device.

What is claimed is:

1. An image-pickup apparatus, comprising:
   a photographing optical system including a focusing device;
   an image-pickup device having a first driving mode for outputting charges in a predetermined number of pixels, and a second driving mode for outputting charges in a number of pixels fewer than the predetermined number of pixels in the first driving mode;
   an image display device; and
   an auto focus arithmetic control unit configured to carry out auto focus calculation and control according to an output signal from the image-pickup device, wherein
   during a preview, the image-pickup device is driven in the first driving mode, and a first image data obtained is displayed on the image display device,
   during an auto focus operation, the auto focus arithmetic control unit is configured to drive the image-pickup device in the second driving mode, and a second image data of a portion of an area which is used for the auto focus calculation and which includes a plurality of blocks is updated and outputted to the image display device, and is enlarged to be displayed on the image display device, the auto focus arithmetic control unit is further configured to detect a focus position of the plurality of blocks, and right after the auto focus operation, the auto focus arithmetic control unit is configured to control the image display device to display blocks that have been focused in the portion of the area used for the auto focus calculation to indicate a focused area in the enlarged image displayed, and the focus area is framed with an On Screen Display for a predetermined period prior to returning to the preview mode.

2. The image-pickup apparatus according to claim 1, wherein the image display device is configured to be a liquid crystal display panel having a backlight, and the auto focus arithmetic control unit is configured to reduce luminance of the backlight during the auto focus operation.

3. A camera comprising an image-pickup apparatus, the image-pickup apparatus including:

a photographing optical system including a focusing device;

an image-pickup device having a first driving mode for outputting charges in a predetermined number of pixels and a second driving mode for outputting charges in a number of pixels fewer than the predetermined number of pixels in the first driving mode;

an image display device; and an auto focus arithmetic control unit configured to detect a focus position according to a signal outputted from the image-pickup device, and to control and drive the focusing device to be located on the focus position, wherein during a preview, the image-pickup device is driven in the first driving mode, and a first image data obtained is displayed on the image display device, during an auto focus operation, the auto focus arithmetic control unit is configured to drive the image-pickup device in the second driving mode, and a second image data of a portion of an area which is used for the auto focus calculation and which includes a plurality of blocks is updated and outputted to the image display device, and is enlarged to be displayed on the image display device, the auto focus arithmetic control unit is further configured to carry out detection of a focus position of the plurality of blocks, and right after the auto focus operation, the auto focus arithmetic control unit is configured to control the image display device to display blocks that have been focused in the portion of the area used for the auto focus calculation to indicate a focused area in the enlarged image displayed, and the focus area is framed with an On Screen Display for a predetermined period prior to returning to the preview mode.

4. The camera according to claim 3, wherein the image display device is a liquid crystal display panel having a backlight, and the auto focus arithmetic control unit is configured to reduce luminance of the backlight during the auto focus operation.

* * * * *